March 27, 1951  J. W. RAY  2,546,957
DRILL CARRIAGE ASSEMBLY
Filed April 1, 1949  2 Sheets-Sheet 1
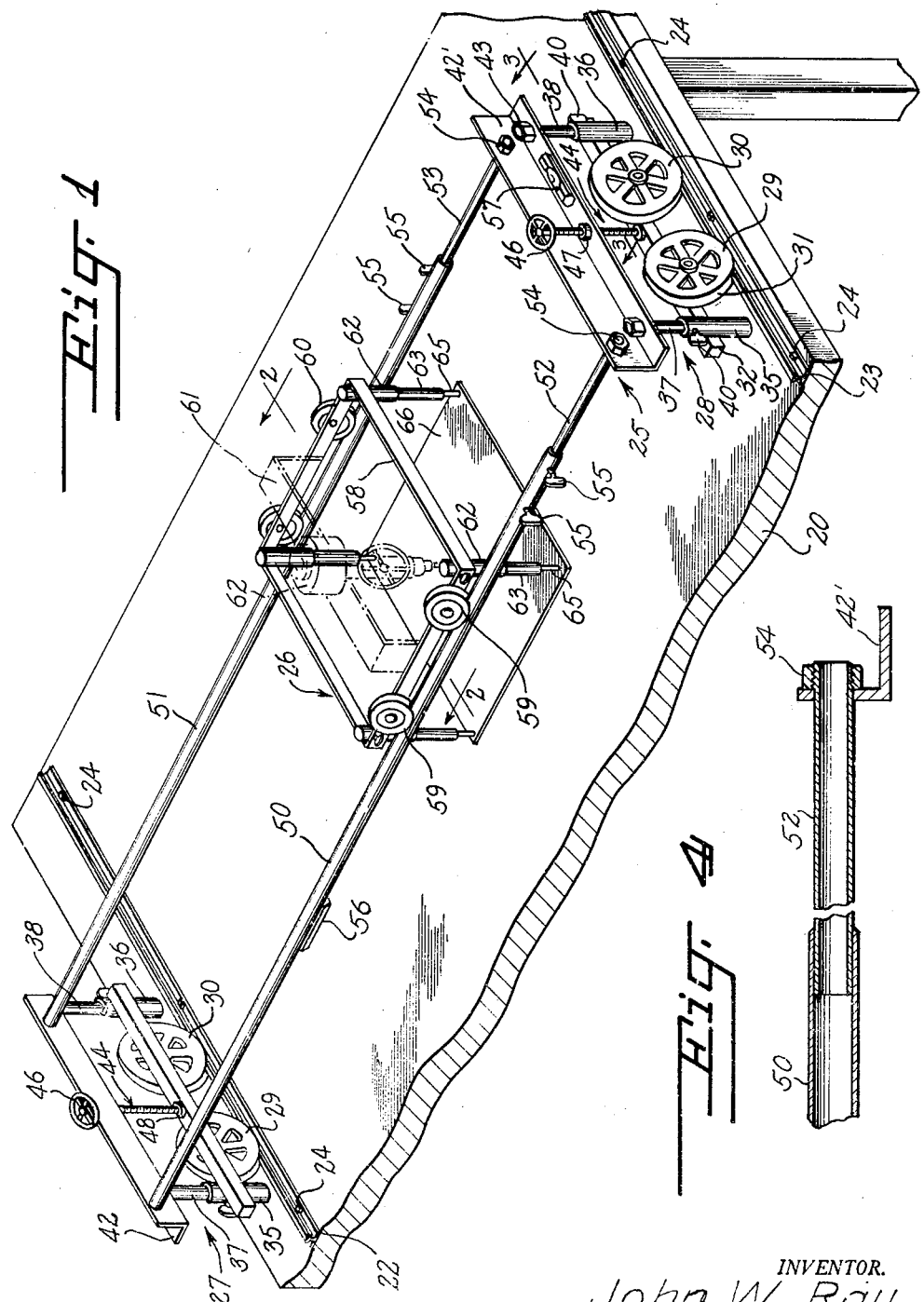
INVENTOR.
John W. Ray
BY
Wilfred E. Lawson
Attorney March 27, 1951 J. W. RAY 2,546,957
DRILL CARRIAGE ASSEMBLY
Filed April 1, 1949 2 Sheets-Sheet 2
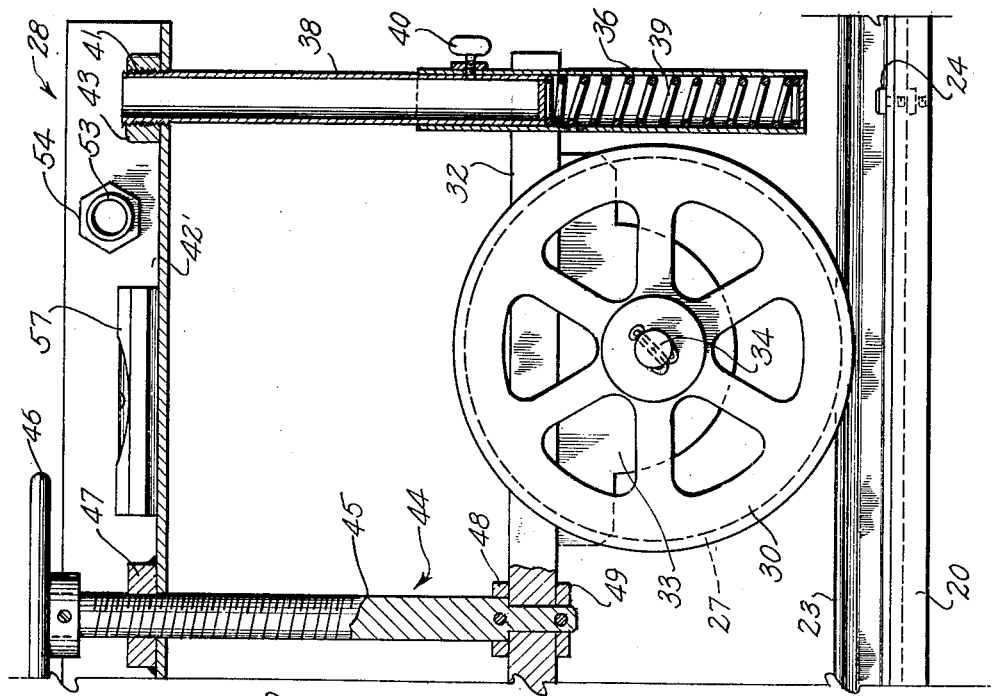
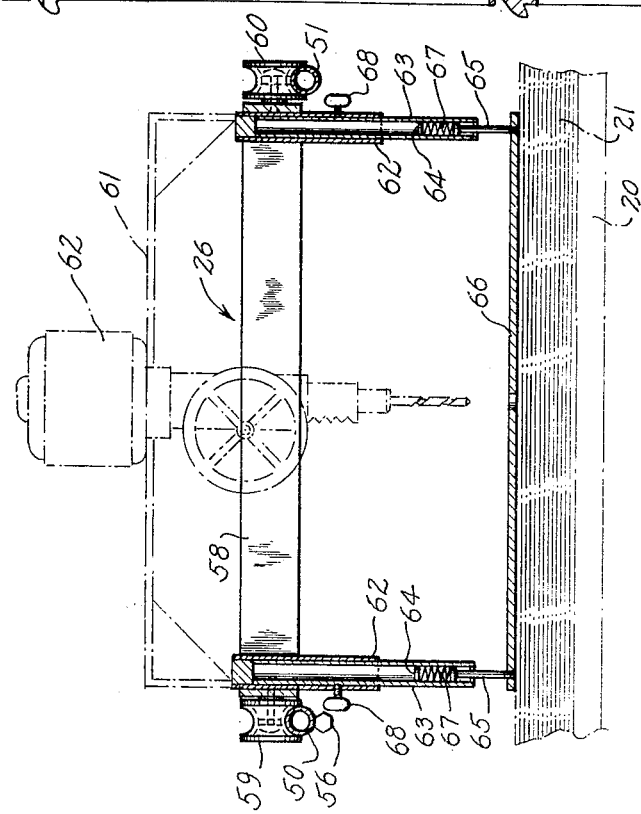
INVENTOR.
John W. Ray
BY *Wilfred E. Lawson*
Attorney Patented Mar. 27, 1951

2,546,957

UNITED STATES PATENT OFFICE 2,546,957

DRILL CARRIAGE ASSEMBLY

John W. Ray, Nashville, Tenn.

Application April 1, 1949, Serial No. 84,960

4 Claims. (Cl. 164—86)

This invention relates to a drilling machine, and more particularly to a machine for drilling holes in cloth.

The object of the invention is to provide an assembly for supporting and conveying a drill which will facilitate and speed up the drilling of holes in the material being worked on, such as cloth.

Another object of the invention is to provide an assembly for conveying a drill and which will traverse the work in all directions whereby the drill can be arranged at any desired position with a minimum of effort.

Still another object of the invention is to provide a drill assembly which will enable the user to quickly and accurately shift the drill to a desired position on the cloth.

A further object of the invention is to provide a drill assembly which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view of the drill assembly according to the present invention;

Figure 2 is a sectional view taken on the line 2—2 of Figure 1;

Figure 3 is a sectional view taken substantially on the line 3—3 of Figure 1;

Figure 4 is a view, partly in section, showing certain constructional details of the assembly; and Figure 5 is a sectional view taken on the line 5—5 of Figure 4.

Referring in detail to the drawings, the numeral 20 designates a table or work supporting body for holding or supporting work such as cloth 21 thereon. The present invention is directed to a drill assembly for carrying a drill used in drilling holes in the material, and the drill assembly comprises a pair of horizontally disposed spaced parallel tracks 22 and 23 which may be secured to the table 20 by suitable securing elements such as headed screws 24.

The drill assembly includes a table carriage 25 and a drill carriage 26. The table carriage 25 comprises a pair of vertically disposed spaced trucks 27 and 28 and each of the trucks 27 and 28 has the same construction. Thus, each truck comprises a pair of wheels 29 and 30 which have their outer peripheries grooved as at 31 for engagement with the complemental track. The trucks 27 and 28 each includes a horizontally disposed bar 32 and the bar 32 has secured thereto a pair of spaced brackets 33, and a short bolt or pin 34 rotatably connects each of the wheels 29 and 30 to the proper bracket 33.

Secured to each of the bars 32 as by welding, is a pair of open topped tubes 35 and 36 and a second tube 37 and 38 is telescopically arranged in each of the tubes 35 and 36 respectively. Positioned in each of the tubes 35 and 36 is a coil spring 39, Figure 3. Carried by each of the tubes 35 and 36 is a manually operable lock screw 40 which projects through the wall of the tube and into engagement with the inner tubes 37 or 38 to maintain the tubes 37 and 38 immobile in their adjusted position.

The upper end of each of the tubes 37 and 38 is threaded exteriorly for a portion of its length as at 41 and the upper ends of the tubes 37 and 38 terminate adjacent a horizontally disposed support member which is preferably fabricated of angle iron. There are two of these horizontally disposed support members, 42 and 42'. Thus, the truck 27 includes a horizontally disposed support member 42 while the other truck 28 is provided with a similar support member 42'. A suitable nut 43 is arranged in engagement with the threaded portion 41 of each of the tubes 37 and 38 for maintaining the parts in assembled relation.

An adjusting screw 44 is carried by each of the trucks 27 and 28 and each of the adjusting screws 44 comprises a shaft 45 which is threaded exteriorly for a major portion of its length. A handle 46 is connected to the top of the shaft 45 for rotating the latter, and the shaft 45 has its upper end arranged in threaded engagement with an interiorly threaded collar 47 which is secured to the support member 42 or 42' as by welding. The lower end of each of the shafts 45 carries a pair of annular members 48 and 49 which embrace opposite sides of the bar 32.

Projecting from the support member 42 of the truck 27 is a pair of spaced parallel horizontally disposed hollow open ended sleeves 50 and 51. An extension rod 52 is telescopically or slidably arranged in the sleeve 50 and a corresponding extension rod 53 slidably projects out of the open end of the other sleeve 51. The rods 52 and 53 have their free ends projecting through a portion of the support member 42' and a suitable nut 54 is arranged in threaded engagement with the projecting end of each of the rods 52 and 53 for maintaining the parts in assembled relation. Thus, the sleeve 51 and rod 52 define one rail for the wheels of the drill carriage, while the other sleeve 51 and rod 53 define another rail for the other wheels of the drill carriage. The telescopic arrangement of the extension rods and the sleeves permit the rails to be extended or contracted in order to permit the trucks 27 and 28 to ride on tracks 22 and 23 which may be spaced apart as desired. For maintaining the extension rods 52 and 53 immobile in their adjusted position in the sleeves 50 and 51, a plurality of lock screws 55 are carried by each of the tubes 50 and 51 for engagement with the telescoping rods 52 and 53. A spirit level guage 56 is carried by the tube 50, and a second spirit level guage 57 is secured or supported by the support member 42 so that leveling of the assembly is assured while the assembly is being adjusted for height.

The drill carriage 26 comprises a rectangular horizontally disposed frame 58 which carries a first pair of grooved wheels 59 for engagement with one of the rails of the table carriage, and a second pair of spaced wheels 60 for engagement with the other rail of the table carriage. Thus, the drill carriage is adapted to move along the rails between the trucks 27 and 28.

A bracket 61 supports a suitable drill 62 broken lines, and the bracket 61 may be secured to the frame 58. Secured to the frame 58, as by welding, is a plurality of hollow tubes or sleeves 62 and a second or inner tube 63 is slidably or telescopically arranged in each of the tubes 62. A ring 64, Figure 2, is positioned in the tube 63 and is secured therein as by welding, and slidably projecting through the lower end of each of the tubes 63 is a pressure rod 65 which has its lower end connected to a horizontally disposed drill plate 66. Positioned in each of the tubes 63 is a coil spring 67 which is interposed between the ring 64 and the upper end of the pressure rod 65 so that a light pressure is exerted on the drill plate 66. For maintaining the tubes 63 immobile in their adjusted position in the tube 62, suitable lock screws 68 are provided.

In use, material which is to be drilled is positioned on the table 20 and the material may be cloth 21. The tracks 22 and 23 are arranged on the table and secured thereto. To position the drill 62 at any desired spot over the material, the entire table carriage 25 may be moved manually along the tracks 22 and 23. Then, the drill carriage 26 is moved transversely along the rails defined by the sleeves 50 and 51 and their respective extension rods so that the drill can be positioned over any desired spot over the material. The spirit level guages 56 and 57 enable the user to ascertain when the machine is correctly leveled or aligned. For adjusting the height of the rails for the drill carriage, the adjusting screws 44 can be rotated in the proper direction by means of the handle 46. The springs 39 in the tubes 35 and 36 maintain the rails level while this adjustment is being made. The height of the drill carriage can be accurately adjusted by unloosening the lock screw 68 and moving the tube 63 to the desired position in the tube 62. Then, the lock screw 68 can be tightened. The drill plate 66 has a light pressure exerted thereon by means of the coil springs 57 and the drill plate 66 serves to hold the material 21 steady or immobile while the material is being worked on or drilled. The tracks 22 and 23 can be spread apart or moved together and the extendable rails can be adjusted to any desired length. Thus, by using the carriage assembly of the present invention a drill may be quickly and readily moved to any desired spot over the material being worked on to thereby increase the accuracy of the operations and enable the workers to perform the operation with a minimum of effort.

While I have shown and described a preferred embodiment of my invention, this is by way of illustration only, and I consider as my own, all such modifications in construction as fairly fall within the scope of the appended claims.

I claim:

1. In a drill assembly, a pair of spaced parallel tracks, a table carriage mounted for travel along said tracks, a drill carriage supported on said table carriage and mounted for travel in a direction perpendicular to said tracks, said table carriage embodying a pair of spaced parallel trucks, a pair of adjustable rails extending between said trucks and connected thereto, and manually operable means for adjusting the height of said rails.

2. In a drill assembly, a pair of spaced parallel tracks, a table carriage mounted for travel along said tracks, a drill carriage supported on said table carriage and mounted for travel in a direction perpendicular to said tracks, said table carriage embodying a pair of spaced parallel trucks, a pair of adjustable rails extending between said trucks and connected thereto, manually operable means for adjusting the height of said rails, and a plurality of spirit levels carried by said table carriage.

3. In a drill assembly, a pair of spaced parallel tracks, a table carriage mounted for travel along said tracks, a drill carriage supported on said table carriage and mounted for travel in a direction perpendicular to said tracks, said drill carriage embodying a frame, a drill plate arranged below said frame and operatively connected to the latter, and means for adjusting said drill plate vertically.

4. A drill assembly comprising a pair of spaced parallel horizontally disposed tracks adapted to be secured to a supporting body, a vertically disposed truck mounted for travel on each of said tracks, each of said trucks comprising a pair of wheels arranged in engagement with the complemental tracks, a horizontally disposed bar connected to each pair of wheels, a pair of vertically disposed open topped tubes carried by said bar, a rod telescopically arranged in each of said tubes, a coil spring positioned in each of said tubes and abutting the lower end of said rod, a horizontally disposed support member connected to the upper end of each of said rods, a manually operable adjusting screw connected to said bar and support member, a pair of horizontally disposed spaced parallel open ended sleeves each having one end secured to one of said support members, an extension rod slidably arranged in each of said sleeves and connected to the other of said support members; said extension rods and sleeves coacting to define a pair of spaced parallel rails, a drill carriage including a pair of wheels arranged in engagement with each of said rails, a frame connected to said last named wheels, and a drill plate operatively connected to said frame and mounted for vertical adjustable movement with respect to said frame.

JOHN W. RAY.

REFERENCES CITED

The following references are of record in the file of this patent:

UNITED STATES PATENTS

| Number | Name | Date |
| --- | --- | --- |
| 2,211,082 | Smith | Aug. 13, 1940 |
| 2,359,037 | Hoffrichter | Sept. 26, 1944 |